United States Patent [19]

Van Deyck et al.

[11] Patent Number: 4,507,271

[45] Date of Patent: Mar. 26, 1985

[54] REMOVAL OF NITROUS OXIDE FROM GASES CONTAINING HYDROGEN, NITRIC OXIDE AND NITROUS OXIDE

[75] Inventors: Frans Van Deyck, Essen, Belgium; Franz-Josef Weiss, Neuhofen, Fed. Rep. of Germany; Roger Verberckt, Schelle, Belgium; Erwin Thomas, Freinsheim, Fed. Rep. of Germany; Benedikt Mangelschots, Berchem; Paul Pijl, Kalmthout, both of Belgium

[73] Assignee: BASF Aktiengesellschaft, Fed. Rep. of Germany

[21] Appl. No.: 555,396

[22] Filed: Nov. 28, 1983

[51] Int. Cl.$^3$ .............................................. C01B 21/14
[52] U.S. Cl. ........................................ 423/387; 55/75; 423/239
[58] Field of Search ................... 55/75; 423/387, 388, 423/239, 405

[56] References Cited

U.S. PATENT DOCUMENTS

| | | | |
|---|---|---|---|
| 2,853,365 | 9/1958 | Barrer et al. | 23/157 |
| 3,011,589 | 12/1961 | Meyer | 55/75 |
| 3,015,369 | 1/1962 | Brennan | 55/75 |
| 3,226,914 | 1/1966 | Griesmer et al. | 55/75 |
| 3,689,212 | 9/1972 | Petit et al. | 423/239 |
| 3,719,026 | 3/1973 | Sand | 55/75 |
| 3,732,326 | 5/1973 | Chen | 55/75 |
| 4,158,047 | 6/1979 | Van de Moesdijk et al. | 423/387 |
| 4,220,632 | 9/1980 | Pence et al. | 423/239 |
| 4,387,082 | 6/1983 | Grosskinsky et al. | 423/387 |
| 4,447,353 | 5/1984 | Pence et al. | 55/75 |

FOREIGN PATENT DOCUMENTS

| | | |
|---|---|---|
| 008479 | 3/1980 | European Pat. Off. . |
| 1177118 | 9/1964 | Fed. Rep. of Germany . |
| 2829703 | 1/1980 | Fed. Rep. of Germany . |

OTHER PUBLICATIONS

"New Selective Sorbents: Porous Crystals as Molecular Filters", *British Chemical Engineering*, pp. 267–279, (May 1959).

Breck, *Zeolite Molecular Sieves*, p. 636, (1974), John Wiley & Sons, Inc.

Primary Examiner—John Doll
Assistant Examiner—Wayne A. Langel
Attorney, Agent, or Firm—Keil & Weinkauf

[57] ABSTRACT

Nitrous oxide is removed from gases containing hydrogen, nitric oxide and nitrous oxide by a process in which the gases are treated with molecular sieves.

9 Claims, No Drawings

REMOVAL OF NITROUS OXIDE FROM GASES CONTAINING HYDROGEN, NITRIC OXIDE AND NITROUS OXIDE

In the preparation of hydroxylammonium salts by catalytic hydrogenation of nitric oxide with hydrogen, nitrous oxide is formed as one of the by-products and, since conversion is not quantitative, the resulting exit gas contains hydrogen, niric oxide, nitrous oxide and inert gases. Such gas mixtures are explosive, particularly under superatmospheric pressure. However, since the exit gases contain useful starting materials, it is desirable to reuse them. European Patent Application No. 008,479 discloses that hydroxylammonium salts are prepared by catalytic reduction of nitric oxide with hydrogen in two separate reaction zones in succession, very pure starting gases being employed. However, the use of such gases industrially is very expensive. Moreover, no indication is given as to how the exit gases can be reused safely. The European patent application also discloses that from 10 to 80 vol% of inert gases is added to the mixture of nitric oxide and hydrogen used, in order to avoid the formation of an explosive exit gas. However, the presence of inert gases makes it more difficult to reuse exit gases of this type. No indication is given as to how to proceed in such a case.

It is an object of the present invention to treat gases containing hydrogen, nitric oxide and nitrous oxide so that they can be reused safely.

We have found that this object is achieved by a process for removing nitrous oxide from a gas containing hydrogen, nitric oxide and nitrous oxide, wherein the gas is treated with molecular sieves.

The novel process has the advantages that nitrous oxide can be removed from gases containing hydrogen, nitric oxide and nitrous oxide in a simple manner, and that the gases thus purified can be reused safely in the hydroxylamine synthesis, particularly under superatmospheric pressure.

The gases treated contain, as a rule, from 50 to 85 vol% of hydrogen, from 5 to 15 vol% of nitric oxide, from 3 to 15 vol% of nitrous oxide and, depending on the purity of the nitric oxide and hydrogen used, from 7 to 20 vol% of inert gases, eg. nitrogen. A typical mixture contains, for example, from 50 to 75 vol% of hydrogen, from 5 to 15 vol% of nitric oxide, from 7 to 15 vol% of nitrous oxide and from 13 to 20 vol% of inert gases.

Such gases are obtained, for example, in the preparation of hydroxylammonium salts by catalytic reduction of nitric oxide with hydrogen. The reaction is carried out at from 30° to 60° C. in the presence of a strong mineral acid, in particular sulfuric acid, and/or ammonium bisulfate, as a rule an aqueous 4–6 normal acid being used. The catalyst used is a suspended noble metal catalyst, in particular a supported platinum catalyst. A suitable process is described in, for example, German Pat. No. 1,177,118.

In accordance with the invention, the gases containing nitrous oxide are treated with molecular sieves, for example by passing them through a layer of such sieves. Preferred molecular sieves are A-, X- or Y-zeolites, as well as natural zeolites, preferably those of the mordenite, faujasite or chabazite type, X-zeolites being particularly preferred. The molecular sieves used advantageously have a pore size of from 4 to 10 Å, in particular from 5 to 9 Å.

Advantageously, any water present in the nitrous oxide-containing gas to be treated is removed before the treatment with molecular sieves, for example by condensing the water at from 2° to 40° C. or by treatment with concentrated sulfuric acid or silica gel. The adsorption of nitrous oxide on the molecular sieves is then preferably carried out at from $-88°$ to 60° C., in particular from $-35°$ to 50° C., and preferably under an absolute pressure of from 1 to 51, in particular from 1 to 25, bar. As soon as the adsorptive capacity of the molecular sieves is exhausted, they are regenerated, for example by treatment at from 0° to 300° C. under reduced pressure, advantageously under an absolute pressure of from 0.02 to 0.4 bar, and/or by treatment with an inert or oxidizing gas, such as nitrogen or air. In order to avoid the formation of an explosive gas mixture, it is advantageous to flush with nitrogen, before desorption, under the pressure used for adsorption.

Advantageously, not less than 2, eg. 4, zones charged with molecular sieves and used, and, as a rule, the zones are connected in series. Advantageously, adsorption is carried out in some of the zones used, while regeneration is effected in the remaining zones; for example, adsorption and regeneration are carried out alternately in a particular zones, half the total number of zones being devoted to each procedure.

The gases treated in this manner contain $<1$, for example from 0.1 to $<1.0$, vol% of nitrous oxide, and, after the ratio of hydrogen to nitric oxide has been adjusted, can be reused for the synthesis of hydroxylamine. After being purified if necessary, the $N_2O$ separated off can be used as a propellant, for example for spray cans.

The Examples which follow illustrate the process according to the invention.

EXAMPLE 1

An exit gas consisting of 55.1 vol% of $H_2$, 6.8 vol% of NO, 11.5 vol% of $N_2O$ and 26.6 vol% of inert gas was dried over silica gel and then passed from below, at a rate of 100 liters/hour, under an absolute pressure of 1.04 bar and at 20° C., into a glass vessel having a diameter of 60 mm and a height of 500 mm and containing 0.8 kg of 13×type molecular sieve (10 Å), passage of the gas being continued for 1.6 hours. The gas emerging at the top had the following composition: 62.25 vol% of $H_2$, 7.7 vol% of NO, 0.05 vol% of $N_2O$ and 30.0 vol% of inert gas. Accordingly, the loading of the molecular sieve was 4.52 g of $N_2O$/100 g of molecular sieve. The molecular sieve was then regenerated with 100 liters/hour of inert gas passed countercurrent to the loading direction for 4 hours under a pressure of 1.04 bar and at 20° C., until the $N_2O$ content in the regenerating gas had dropped to 0.05 vol%.

EXAMPLE 2

An exit gas consisting of 65 vol% of $H_2$, 10 vol% of NO, 12.3 vol% of $N_2O$ and 12.7 vol% of inert gas was dried over aluminum oxide gel and then passed from below, at a rate of 200 liters/hour, under an absolute pressure of 1.04 bar and at 31° C., into an apparatus as described in Example 1 and containing 0.8 kg of A type molecular sieve (5 Å), passage of the gas being continued for 1.2 hours. The gas emerging at the top contained 0.05 vol% of $N_2O$, the loading of the molecular sieve was 7.37 g of $N_2O$/100 g of molecular sieve, and regeneration was carried out as described in Example 1.

EXAMPLE 3

The same purification effect and a loading of 3.62 g of $N_2O/100$ g of molecular sieve were obtained in an apparatus as described in Example 1 and containing X type molecular sieve (9 Å), the throughput of gas through the adsorber being 300 liters/hour, the temperature 20° C. and the absolute pressure 1.04 bar.

EXAMPLE 4

An exit gas consisting of 55 vol% of $H_2$, 10.5 vol% of NO, 14 vol% of $N_2O$, 1.1 vol% of $H_2O$ (dew point: 14° C.) and 19.4 vol% of inert gas was passed from below, at a rate of 500 liters/hour (under operating conditions), under an absolute pressure of 1.36 bar and at 21° C., into a stainless steel vessel having a diameter of 100 mm and an effective height of 480 mm and containing 2.85 kg of 13X type molecular sieve (10 Å), passage of the gas being continued for 40 minutes. The molecular sieve was dried beforehand for 67 hours at 215° C. and then cooled to 20° C. with 1,856 liters of nitrogen under an absolute pressure of 1.0 bar.

The gas emerging at the top of the adsorber had the following composition: 65 vol% of $H_2$, 12 vol% of NO, 0 vol% of $N_2O$, 0 vol% of $H_2O$ (dew point: −29° C.) and 23 vol% of inert gases. During the adsorption, the temperature of the molecular sieve increased to 41° C. The loading of the molecular sieve until the $N_2O$ breakthrough was reached with 0.2 vol% of $N_2O$ in the gas emerging was accordingly 4.4 g of $N_2O/100$ g of molecular sieve. After the breakthrough, the molecular sieve was loaded for a further 55 minutes, until the gas emerging at the top had the following composition: 57 vol% of $H_2$, 11 vol% of NO, 12 vol% of $N_2O$, 0 vol% of $H_2O$ (dew point: −27.5° C.) and 20 vol% of inert gas. The molecular sieve was then flushed, countercurrent to the loading direction, with 31 liters of nitrogen in the course of 12 minutes, until the gas was free of $H_2$ and NO, after which it was regenerated under an absolute pressure of 0.08 bar (final pressure) while flushing with 807 liters of nitrogen at 21° C. in the course of 10.4 hours. The $N_2O$ content of the regenerating gas had then dropped to 0.5 vol%. After this regeneration procedure, the same molecular sieve was loaded again. 600 liters/hour (under operating conditions) of an exit gas consisting of 54 vol% of $H_2$, 14 vol% of NO, 14.5 vol% of $N_2O$, 1.2 vol% of $H_2O$ (dew point: 15° C.) and 16.3 vol% of inert gases were passed in from below under an absolute pressure of 1.35 bar and at 22.5° C. for 30 minutes. The gas emerging at the top had the following composition: 64 vol% of $H_2$, 17 vol% of NO, 0 vol% of $N_2O$, 0 vol% of $H_2O$ (dew point: −26° C.) and 19 vol% of inert gases. During the adsorption, the temperature of the molecular sieve increased to 42° C. The loading of the molecular sieve until the $N_2O$ break-through was reached with 0.2 vol% of $N_2O$ in the gas emerging was accordingly 4.1 g of $N_2O/100$ g of molecular sieve.

EXAMPLE 5

To test the adsorptive capacity of the molecular sieve after several loadings, the apparatus described in Example 4, containing 2.85 kg of 13X type molecular sieve (10 Å), was operated in accordance with a particular adsorption/regeneration cycle, but loading of the molecular sieve was terminated before the breakthrough was reached. The exit gas used had a slightly variable composition, as stated on page 2, and a mean $N_2O$ content of 14 vol% and a water content of from 1 to 1.5 vol%. Twelve cycles were carried out, each consisting of adsorption for 15 minutes under an absolute pressure of 1.32 bar and at 20° C., followed in each case by flushing with 250 liters/hour of $N_2$ for 5 minutes under an absolute pressure of 1.4 bar and at 20° C. to remove $H_2$ and NO and, thereafter, desorption for 40 minutes under an absolute pressure of 0.05 bar and at 20° C., $N_2$ (5 liters/hour) being fed in during the desorption process for the first 9 cycles, but not for the last 3. $N_2O$ was removed completely from the exit gas in each case. About 40 g of $N_2O$ (about 1.4 g of $N_2O/100$ g of molecular sieve) were adsorbed in each adsorption process.

We claim:

1. A process for preparing hydroxylammonium salts comprising the steps of treating a gas containing hydrogen, nitric oxide and nitrous oxide with molecular sieves to remove nitrous oxide therefrom, and then catalytically reducing the nitric oxide with hydrogen in the treated gas in the presence of a strong mineral acid to form hydroxylammonium salts.

2. A process as claimed in claim 1, wherein the molecular sieve used is an A, X or Y zeolite.

3. A process as claimed in claim 1, wherein, before the treatment, water is removed from the gas containing nitrous oxide.

4. A process as claimed in claim 1, wherein the treatment with molecular sieves is carried out at from −35° to 50° C.

5. A process as claimed in claim 1, wherein the treatment with molecular sieves is carried out under an absolute pressure of from 1 to 51 bar.

6. A process as claimed in claim 1, wherein the molecular sieves are regenerated under reduced pressure and/or by treatment with an inert or oxidizing gas.

7. A process as claimed in claim 6, wherein the regeneration is carried out at from 0° to 300° C.

8. A process as claimed in claim 1, wherein the treatment is effected in not less than 2 zones, adsorption and regeneration being carried out alternately.

9. A process as claimed in claim 1, wherein the gas treated is one which is obtained in the preparation of hydroxylammonium salts by catalytic reduction of nitric oxide with hydrogen in the presence of a strong aqueous mineral acid.

* * * * *

UNITED STATES PATENT AND TRADEMARK OFFICE
CERTIFICATE OF CORRECTION

PATENT NO. : 4,507,271

DATED : March 26, 1985

INVENTOR(S) : VAN DEYCK et al.

It is certified that error appears in the above-identified patent and that said Letters Patent is hereby corrected as shown below:

Please insert on the covering sheet:

--[30] Foreign Application Priority Data

December 1, 1982 [DE] Fed. Rep. of Germany....3244370 --.

Signed and Sealed this

Thirtieth Day of September 1986

[SEAL]

Attest:

DONALD J. QUIGG

Attesting Officer

Commissioner of Patents and Trademarks